(12) United States Patent
Ohtani et al.

(10) Patent No.: US 6,807,420 B2
(45) Date of Patent: Oct. 19, 2004

(54) MOBILE COMMUNICATION SYSTEM, MOBILE STATION AND DIVERSITY HANDOVER BRANCH CONTROL METHOD

(75) Inventors: Tomoyuki Ohtani, Yokosuka (JP); Motoshi Tamura, Yokosuka (JP); Takaaki Sato, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/384,314

(22) Filed: Mar. 7, 2003

(65) Prior Publication Data

US 2003/0157936 A1 Aug. 21, 2003

Related U.S. Application Data

(62) Division of application No. 09/230,956, filed on Feb. 4, 1999, now Pat. No. 6,728,277
(60) Provisional application No. PCT/JP98/02456, filed on Jun. 3, 1998.

(30) Foreign Application Priority Data

Jun. 4, 1997 (JP) .............................................. 9/146940

(51) Int. Cl.⁷ .......................... H04Q 7/20; H04B 15/00; H04B 7/005; H04B 7/01; H04B 7/015
(52) U.S. Cl. ........................ 455/436; 455/503; 375/224
(58) Field of Search ................................ 455/436, 503, 455/574, 437, 450; 375/224; 370/252

(56) References Cited

U.S. PATENT DOCUMENTS 5,504,935 A * 4/1996 Vercauteren
5,574,983 A * 11/1996 Douzono et al. .............. 455/69
6,389,066 B1 * 5/2002 Ejzak .......................... 375/224

(List continued on next page.)

FOREIGN PATENT DOCUMENTS

| CA | 2141445 | 12/1994 |
|----|---------|---------|
| EP | 0896442 A1 | 2/1999 |
| JP | 9-508773 | 9/1997 |

(List continued on next page.)

OTHER PUBLICATIONS

"Handover Equipment and its Control Method in the Next Generation Mobile Communcations System" presented by Hisashi Shimizu et al. at 1997 General Meeting of the Institute of Electronics, Information and Communication Engineers.

Diversity Handover Branch Control for IMT–2000: presented by Tomoyuki Otani (or Otani) et al. at 1997 Meeting of the Institute of Electronics, Information and Communications Engineers.

"The Classification of Handover in CDMA Systems" presented by Takaaki Sato et al. at 1997 General Meeting of the Institute of Electronics, Information and Communication Engineers.

Primary Examiner—William Cumming
(74) Attorney, Agent, or Firm—Workman Nydegger

(57) ABSTRACT

A branch candidate selecting method by a mobile station and a diversity handover control method on a network side in DHO performance are provided which consider a maximum cable branch number and maximum radio branch number of the mobile station, when the mobile station detects the plurality of addition branch candidates and deletion branch candidates. The mobile station inserts a plurality of addition branch candidates and deletion branch candidates, that is, all the DHO candidates into one handover trigger signal, and notifies the network. The addition branch candidates are put into addition information parameters in the handover trigger signal, and the deletion branch candidates are put into deletion information parameters. To simplify processing on the network side, the network side separates the addition branch candidates from the deletion branch candidates, and carries out sequential processing of them independently.

1 Claim, 18 Drawing Sheets

U.S. PATENT DOCUMENTS

| | | | | |
|---|---|---|---|---|
| 6,470,188 B1 | * | 10/2002 | Ohtani et al. | 455/503 |
| 6,584,330 B1 | * | 6/2003 | Ruuska | 455/574 |
| 2002/0012321 A1 | * | 1/2002 | Rune et al. | 370/252 |
| 2002/0025815 A1 | * | 2/2002 | Rune et al. | 455/436 |
| 2002/0090948 A1 | * | 7/2002 | Nagata | 455/437 |
| 2002/0094817 A1 | * | 7/2002 | Rune et al. | 455/450 |
| 2002/0151306 A1 | * | 10/2002 | Ohtani et al. | 455/436 |

FOREIGN PATENT DOCUMENTS

| | | | |
|---|---|---|---|
| JP | 0935400 | * | 8/1999 |
| WO | WO 95 32594 | | 11/1995 |
| WO | WO 97 08911 | | 3/1997 |
| WO | WO 98 29970 | | 7/1998 |
| WO | WO 98 30052 | | 7/1998 |
| WO | WO98/56196 | * | 12/1998 |

* cited by examiner

FIG.4A

ADDITION INFORMATION PARAMETER FORMAT

| NUMBER OF VISITOR LOCATION SECTORS UNDER COMMUNICATION |
| --- |
| NUMBER OF ADDITION DHO CANDIDATE SECTORS |
| BASE STATION NUMBER |
| SECTOR NUMBER |
| PERCH CHANNEL RECEIVED SIR |
| PERCH CHANNEL TRANSMISSION POWER LEVEL |
| ∫ |
| BASE STATION NUMBER |
| SECTOR NUMBER |
| PERCH CHANNEL RECEIVED SIR |
| PERCH CHANNEL TRANSMISSION POWER LEVEL |

FIG.4B

DELETION INFORMATION PARAMETER FORMAT

| NUMBER OF DELETION DHO CANDIDATE SECTORS |
| --- |
| BASE STATION NUMBER |
| SECTOR NUMBER |
| ∫ |
| BASE STATION NUMBER |
| SECTOR NUMBER |

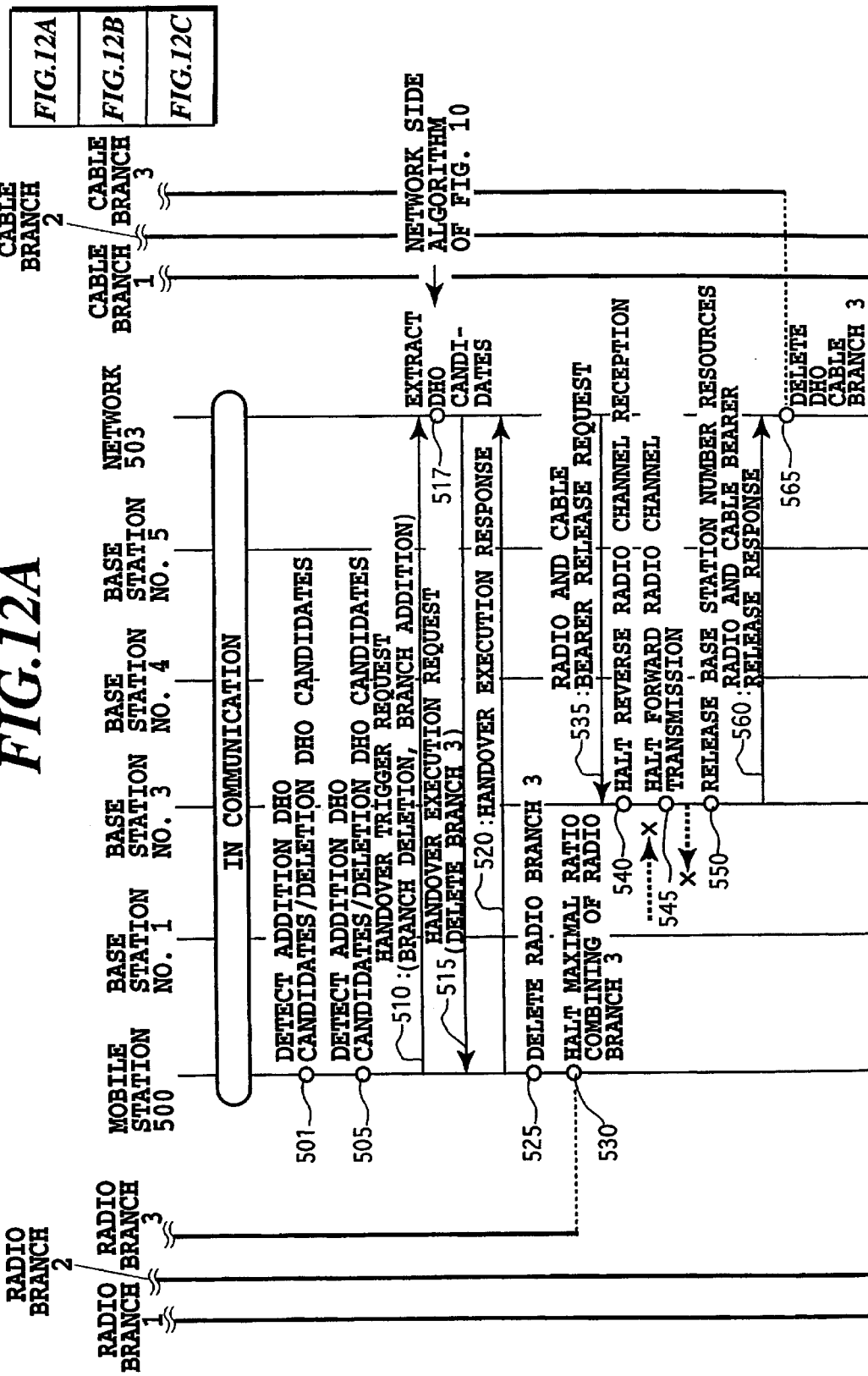

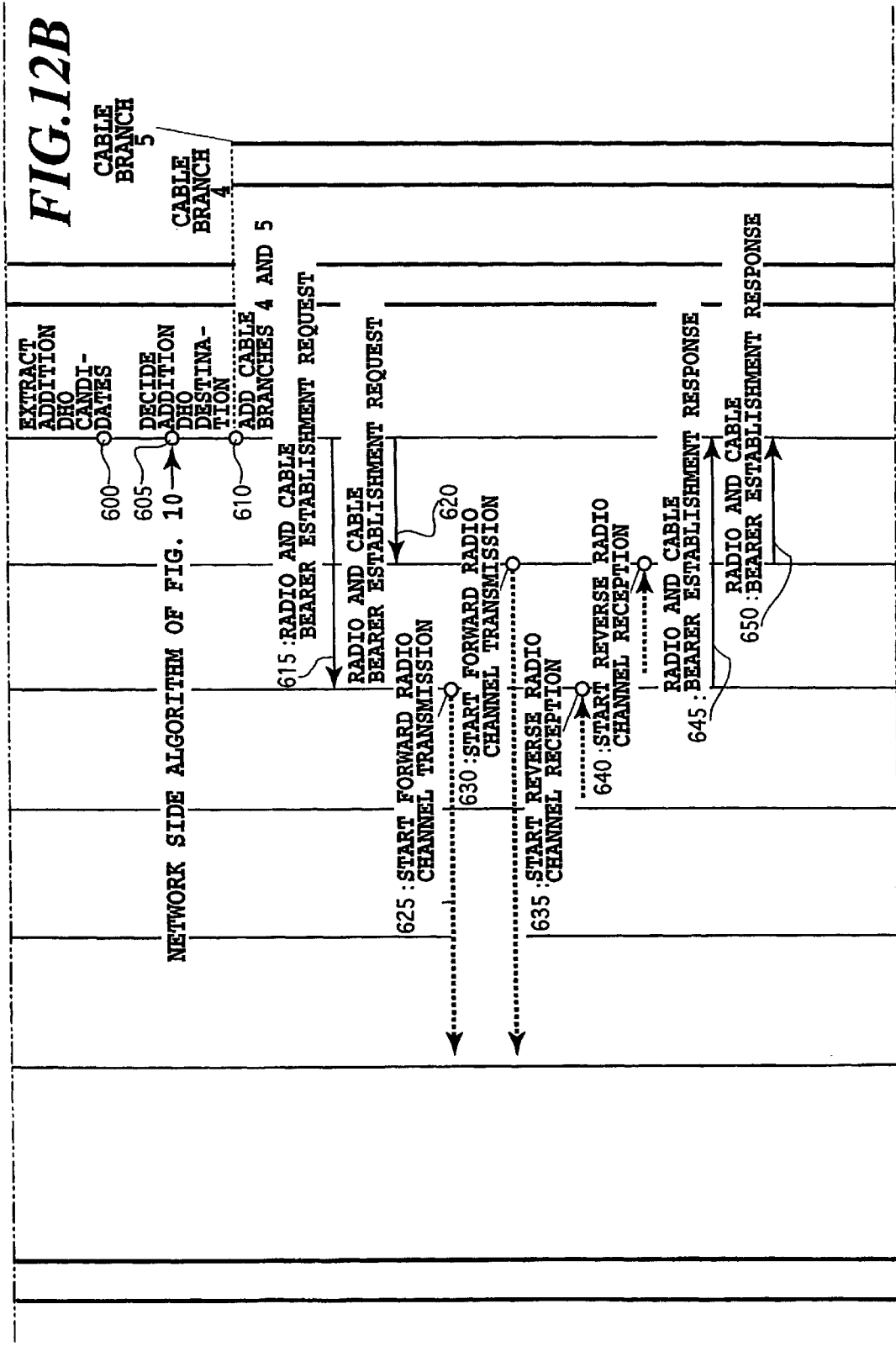

MOBILE COMMUNICATION SYSTEM, MOBILE STATION AND DIVERSITY HANDOVER BRANCH CONTROL METHOD

CROSS-REFERENCE TO RELATED APPLICATIONS

This application is a divisional application of commonly assigned, co-pending U.S. patent application Ser. No. 09/230,956, filed Feb. 4, 1999 and entitled "Mobile Radio Communication System, Mobile Station, and Method for Controlling Diversity Hand-Over Branch", which is a 371 of PCT/JP98/02456 filed Jun. 6, 1998, which application is incorporated herein by reference in its entirety.

BACKGROUND OF THE INVENTION

1. The Field of the Invention

The present invention relates to a branch candidate selecting method in a mobile station in the case where the mobile station detects a plurality of addition branch candidates and deletion branch candidates, and to a diversity handover branch control method on a network side in executing diversity handover.

2. The Relevant Technology

Recently, code division multiple access (CDMA) technology has been proposed as one of promising radio transmission methods for implementing multimedia communications in the next generation mobile communication network systems. A CDMA system carries out diversity handover (DHO) that establishes multiple communication links (branches) between a mobile station and a plurality of base stations while the mobile station is moving near a boundary of a radio area, and communicates by performing signal combining (selection combining) on the multiple communication links. In the diversity condition, it is possible to increase a radio capacity by controlling such that the mobile station and the base stations can communicate at minimum transmission power (transmission power control). Furthermore, it is possible in the diversity condition to eliminate instantaneous chopping during handover, which can occur in the conventional time division multiple access (TDMA).

Establishing a new branch in the DHO is specifically referred to as "addition DHO" in the DHO, and deleting a communication branch not contributing to the communications in the diversity condition is specifically referred to as "deletion DHO" in the DHO. To carry out the addition DHO and deletion DHO, the mobile station normally detects a candidate of the addition DHO (called "addition DHO candidate" or "addition branch candidate"), and a candidate of the deletion DHO (called "deletion DHO candidate" or "deletion branch candidate"). Detecting an addition or deletion branch candidate by monitoring a radio condition (transmission loss, for example) of a perch in the current sector or peripheral sectors, the mobile station notifies the network side of the detected candidate. The network side performs the DHO (addition DHO or deletion DHO) based on the notified candidate. The term "network side" usually refers to a switching center or a control center of base stations, it is possible to provide this function to the base stations.

The mobile station communicates with the base stations using individual radio links (radio branches) associated with the base stations. A switching center comprises cable links (cable branches) connecting it with the base stations that are communicating with the mobile station, and carries out, with a handover (HO) processor or a diversity handover trunk (DHT), the selection combining of the signals sent from the base stations. The fundamental operation of the diversity handover branch is disclosed in Japanese Patent Application Laid-open No. 9-508773 (1997), and network configurations and control methods of the diversity handover trunks are disclosed in Japanese Patent Application No. 8-348900 (1996).

Because of hardware implementation or the like, there are provided an upper limit to the number of radio branches (a maximum radio branch number) that the mobile station can establish simultaneously, and an upper limit to the number of cable branches (a maximum cable branch number) that the DHT in the switching center can connect or process simultaneously. The upper limit to the number of communication branches (the maximum communication branch number) that can be established in the diversity condition equals the smaller one of the maximum numbers of the radio branches and cable branches. In ordinary systems, it is designed that the maximum radio branch number becomes equal to the maximum communication branch number to make effective use of radio resources by giving priority to them.

However, conventional papers (for example, Shimizu, et al. "Handover equipment and control method in next generation mobile communication systems", General assembly of the Institute of Electronics, Information and Communication Engineers of Japan, 1997) handle the subject only under the assumption that the control of branches to be added or deleted is limited to a single branch, and do not handle simultaneous control of a plurality of addition branches and deletion branches. It is not specified in ITU-T recommendation Q.FIF version 6, as well.

As mentioned above, since the control of the branches to be added and deleted is carried out on one by one basis in the prior art, N times of control is required in principle to control N branches. However, the mobile station can detect a plurality of deletion branch candidates and addition branch candidates at the same time, because their detection depends on the ambient radio condition.

In such a case, a number of times of similar control operations are repeated between the mobile station and the switching center, which is not only inefficient, but also takes an extra time for the control until the entire handover control is completed.

Taking account of the addition DHO of a single branch, the prior art sets the maximum cable branch number at the maximum radio branch number plus one. Thus, the network side can prepare the branches in cable sections by the number greater than the maximum radio branch number by one. This enables a simple switching operation in the radio sections to complete the addition DHO by adding one cable branch from among the prepared cable branches without deleting the communication branch even in the case where one branch is added to the maximum number of branches.

However, such a method that follows the prior art, in which the maximum cable branch number is set at the number greater than the maximum radio branch number by one, has a problem of impairing effective control because of the network side control repeated by the number of addition branch candidates. Furthermore, no prior art takes account of handling any addition branch candidates that have not been prepared in the cable section, even though they have higher DHO priority than the communication branches, because the control unit is for a single branch and the maximum cable branch number is limited.

BRIEF SUMMARY OF THE INVENTION

Therefore, the present invention is implemented to solve the foregoing problems. An object of the present invention is to provide a branch candidate selecting method in a mobile station and a control method of diversity handover branches on a network side, considering a maximum cable branch number and a maximum radio branch number of the mobile station in the case where the mobile station detects a plurality of addition branch candidates and deletion branch candidates. In the first aspect of the present invention, there is provided a mobile communication system comprising a mobile station, a base station connected to the mobile station, and a switching center connected to the base station, wherein the mobile station notifies the switching center of information on one or more addition branch candidates between the mobile station and the base station, and of information indicative of precedence of the addition branch candidates; and the switching center performs handover control in accordance with the information notified.

Here, information transmitted from the mobile station to the switching center may further include information on one or more communicating branches between the mobile station and the base station.

The switching center may establish a communication branch between the mobile station and the switching center using information on one or more communicating branches between the mobile station and the base station, the transmitted information on one or more addition branch candidates between the mobile station and the base station, and the information on the precedence of the addition branch candidates.

The switching center may establish, when a sum total of a number of communicating branches and a number of the addition branch candidates exceeds a maximum radio branch number simultaneously establishable in communications between the mobile station and the base station, a communication branch in order of precedence up to a maximum cable branch number that can be processed simultaneously by the switching center.

In the second aspect of the present invention, there is provided a mobile station of a mobile communication system comprising the mobile station, a base station connected to the mobile station, and a switching center connected to the base station, wherein information transmitted from the mobile station to the switching center includes information on one or more deletion branch candidates between the mobile station and the base station.

In the third aspect of the present invention, there is provided a mobile communication system including a mobile station, a base station connected to the mobile station, and a switching center connected to the base station, wherein the switching center creates settings for deleting one or more communicating branches.

In the fourth aspect of the present invention, there is provided a mobile station of a mobile communication system including the mobile station, a base station connected to the mobile station, and a switching center connected to the base station, wherein the mobile station notifies the switching center of information on one or more addition branch candidates between the mobile station and the base station, and of information indicative of precedence of the addition branch candidates.

Here, the mobile station may notify, while communicating with the base station using a maximum number of radio branches simultaneously establishable, the switching center of addition of the addition branch candidates, when precedence of an addition branch candidate to be added exceeds, by an amount of a predetermined threshold value, precedence of a communicating branch with lowest precedence.

Information transmitted from the mobile station to the switching center may further include information on one or more communicating branches between the mobile station and the base station.

In the fifth aspect of the present invention, there is provided a diversity handover branch control method in a mobile communication system including a mobile station, a base station connected to the mobile station, and a switching center connected to the base station, wherein information transmitted from the mobile station to the switching center includes information on one or more deletion branch candidates between the mobile station and the base station.

In the sixth aspect of the present invention, there is provided a diversity handover branch control method, in which a mobile station detects one or more addition branch candidates constituting handover candidates in communications between the mobile station and a base station connected to the mobile station, and notifies a switching center connected to the base station of the addition branch candidates, wherein information transmitted from the mobile station to the switching center includes information on one or more addition branch candidates between the mobile station and the base station, and information indicative of precedence of the addition branch candidates.

Here, the information transmitted from the mobile station to the switching center may further include information on one or more communicating branches between the mobile station and the base station.

The information indicative of precedence may be an order of arrangement of information on the communicating branches and information on the addition branch candidates.

The information indicative of precedence may consist of numerals representing information on the communicating branches and information on the addition branch candidates.

The information indicative of precedence may be an order of arrangement of information on the addition branch candidates.

The order of arrangement may be a decreasing order of transmission losses.

The information indicative of precedence may consist of numerals representing information on the addition branch candidates.

The switching center may establish the communication branches between the mobile station and the switching center using information on one or more communicating branches between the mobile station and the base station, transmitted information on the one or more addition branch candidates, and information indicative of precedence of the addition branch candidates.

The switching center may establish, when a sum total of a number of communicating branches and a number of the addition branch candidates exceeds a maximum radio branch number simultaneously establishable in communications between the mobile station and the base station, a communication branch in order of precedence up to a maximum cable branch number that can be processed simultaneously by the switching center.

The maximum cable branch number may be greater than the maximum radio branch number by N, where N is an integer equal to or greater than one.

The mobile station may make a decision of the addition branch candidates again and notify the switching center of the addition branch candidates, when a total sum of a communicating branch number and an addition branch number exceeds the maximum cable branch number, and hence the addition branch candidates are not added because of restrictions on an upper limit of the maximum cable branch number.

The switching center may store, when the addition branch candidates are not added because of the upper limit of the maximum cable branch number, branch candidates that cannot be added because of the upper limit of the maximum cable branch number, and autonomously carries out control.

In the seventh aspect of the present invention, there is provided a mobile communication system including a mobile station, a base station connected to the mobile station, and a switching center connected to the base station, wherein information transmitted from the mobile station to the switching center includes information on one or more deletion branch candidates between the mobile station and the base station.

In the eighth aspect of the present invention, there is provided a diversity handover branch control method in a mobile communication system comprising a mobile station, a base station connected to the mobile station, and a switching center connected to the base station, wherein the switching center creates settings for deleting one or more communication branches.

In the ninth aspect of the present invention, there is provided a diversity handover branch control method in a mobile communication system including a mobile station, a base station connected to the mobile station, and a switching center connected to the base station, wherein the mobile station autonomously creates settings for deleting one or more communication branches.

In the tenth aspect of the present invention, there is provided a diversity handover branch control method, in which a mobile station detects one or more communication branches constituting handover candidates, and notifies a switching center of the communication branches, wherein the mobile station autonomously deletes one or more communication branches, and subsequently notifies the switching center of the deleted branches via a remaining communication branch.

In the eleventh aspect of the present invention, there is provided a diversity handover branch control method, in which a mobile station detects one or more communication branches constituting handover candidates, wherein the mobile station autonomously deletes one or more communication branches, and subsequently a switching center, which is connected with the mobile station through a base station, deletes a corresponding cable branches by detecting disconnection of the radio branch.

In the twelfth aspect of the present invention, there is provided a diversity handover branch control method, in which a mobile station detects one or more addition branch candidates constituting handover candidates in communications between the mobile station and a base station connected to the mobile station, and notifies a switching center connected to the base station of the addition branch candidates, wherein the mobile station does not notify, when a communicating branch number equals a simultaneously establishable maximum radio branch number between the mobile station and the base station, the switching center of information on addition branch candidates that are unlikely to be added in diversity handover.

In the thirteenth aspect of the present invention, there is provided a diversity handover branch control method, in which a mobile station detects one or more addition branch candidates constituting handover candidates in communications between the mobile station and a base station connected to the mobile station, and notifies a switching center connected to the base station of the addition branch candidates, wherein the mobile station notifies, when a sum total of a communicating branch number and an addition branch candidate number is equal to or less than a simultaneously establishable maximum radio branch number between the mobile station and the base station, the switching center of the addition branch candidates.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A is a diagram showing a format of addition information parameters;

FIG. 4B is a diagram showing a format of deletion information parameters;

FIG. 12 is a diagram illustrating the relationship between FIGS. 12A, 12B and 12C linked in this order;

FIG. 12A is a diagram illustrating a DHO processing sequence when the radio condition as illustrated in FIG. 11 takes place in a mobile station;

FIG. 12B is a diagram illustrating the DHO processing sequence when the radio condition as illustrated in FIG. 11 takes place in the mobile station;

DETAILED DESCRIPTION OF THE PREFERRED EMBODIMENTS

The invention will now be described with reference to the accompanying drawings.

Figure 1:
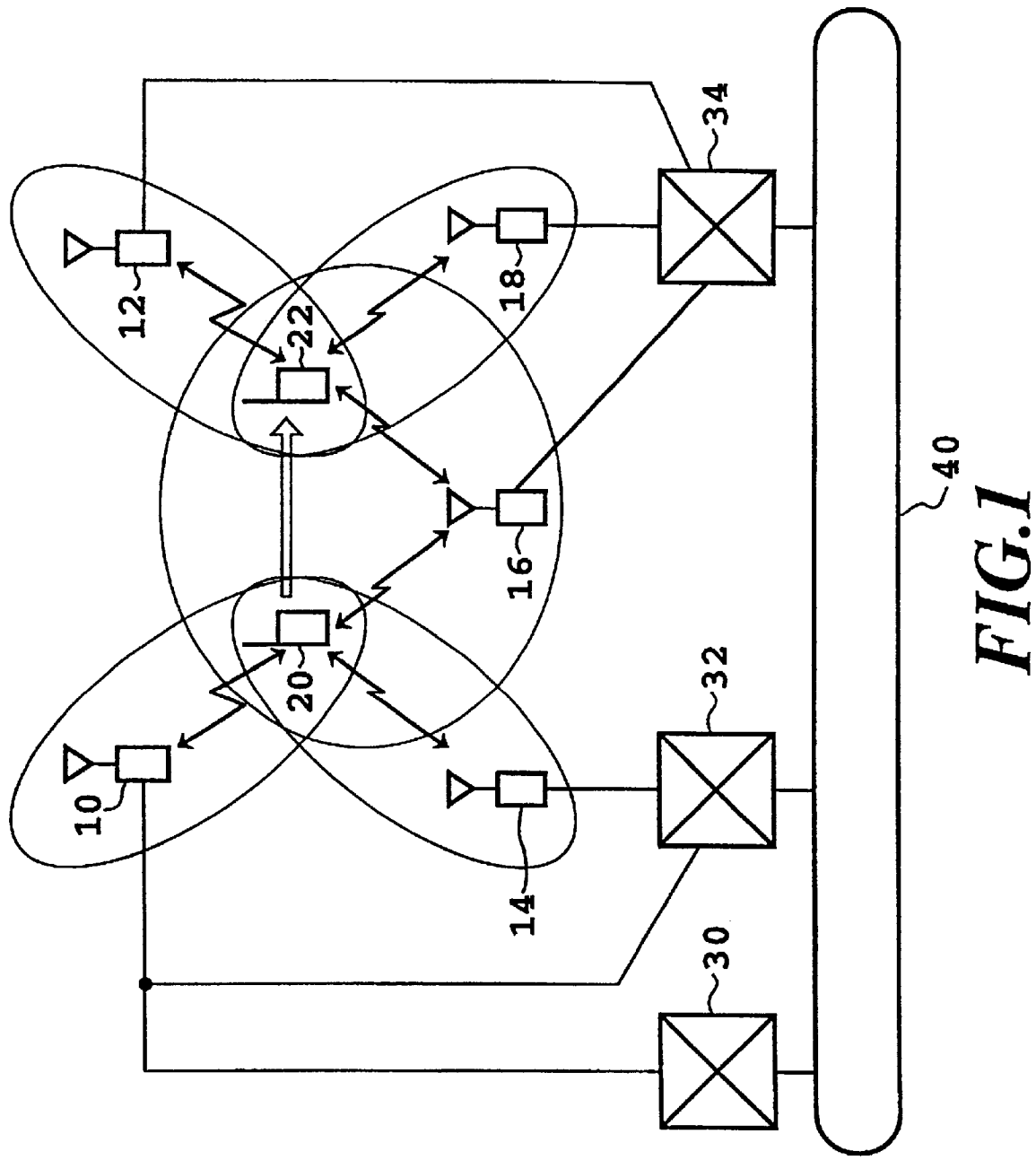
FIG. 1 is a schematic diagram illustrating an embodiment of a diversity handover branch control method in accordance with the present invention.

FIG. 1 is a schematic diagram illustrating an embodiment of a diversity handover branch control method in accordance with the present invention.

In FIG. 1, a mobile station (MS) 20 is a device such as a mobile phone and a mobile information terminal, which has radio communication functions, and base stations (BS's) 10, 14 and 16 are radio stations that communicate with the mobile station 20. The mobile station communicates with the base stations 10, 14 and 16 at first. Mobile services switching center (MSC) 30, 32 or 34, which is connected with one of the base stations 10, 12, 14, 16 and 18 through a cable, has base station control functions that perform radio control of the base stations 10 and others, and a paging control function that provides the mobile station 20 and others with communication services through the base stations 10 and others. It will be needless to say that the mobile switching center 30, 32 or 34 can be connected with the base station 10, 12, 14, 16 or 18 through fixed radio channels instead of the cable. One mobile switching center can handle a plurality of base stations. Although the base station 10 is connected double through cable channels to both the mobile services switching centers 30 and 32 in FIG. 1, this is for the purpose of load distribution or switching between operating and standby systems, and each base station is connected to one of the mobile services switching centers during a single communication term. When the mobile station 20 moves to the area of the mobile station 22, and acquires quality communication condition with the base stations 12 and 18, the base stations 12 and 18 each become an addition branch candidate. In this case, if the radio condition between the mobile station 20 and the base stations 10 and 14 deteriorates, the base stations 10 and 14 each become a deletion branch candidate. Thus, because the addition branch candidate is present, it does not necessarily follow that the deletion branch candidate is present. The mobile services switching centers 30, 32 and 34 are interconnected through a trunk circuit network.

Next, types of control of the DHO the present invention employs will be described.

The DHO is roughly divided into the addition DHO, deletion DHO and addition deletion DHO which is a special case of the addition DHO. The addition DHO is one that adds a new branch candidate, whereas the deletion DHO is one that deletes a branch candidate under communications which does not contribute to any communications. Control procedures of these DHO will now be described.

[Addition DHO]

Figure 2:
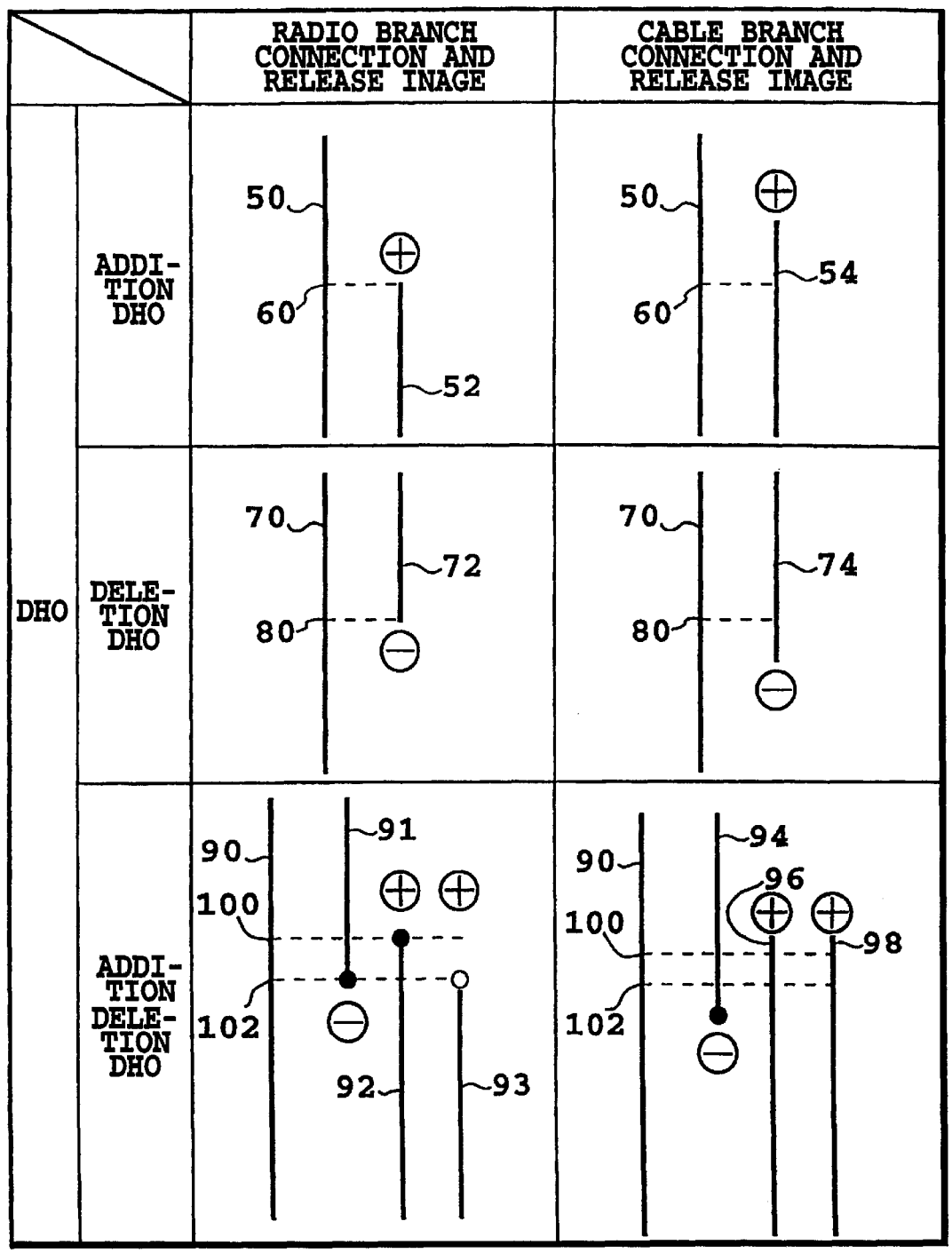
FIG. 2 is a diagram illustrating images of branch connection and release on a mobile station side and a network side in respective DHO operations.

FIG. 2 illustrates images of the branch connection and release on the mobile station side and network side in the respective DHO operations.

The radio branch connection and release image of the addition DHO in FIG. 2 indicates that a new radio branch 52 is added at a time 60 in the presence of a communicating branch 50. The cable branch connection and release image of the addition DHO indicates that a new cable branch 54 is added. In the branch control sequence in the addition DHO, the addition (cable) branch 54 comes first, and then the addition (radio) branch 52.

The mobile station monitors radio conditions (for example, monitors transmission losses on the perch) of peripheral sectors, and selects addition branch candidates from among the branches that meet the addition branch candidate decision conditions, that is, the mobile station's detection conditions of the addition branch candidate.

Figure 3:
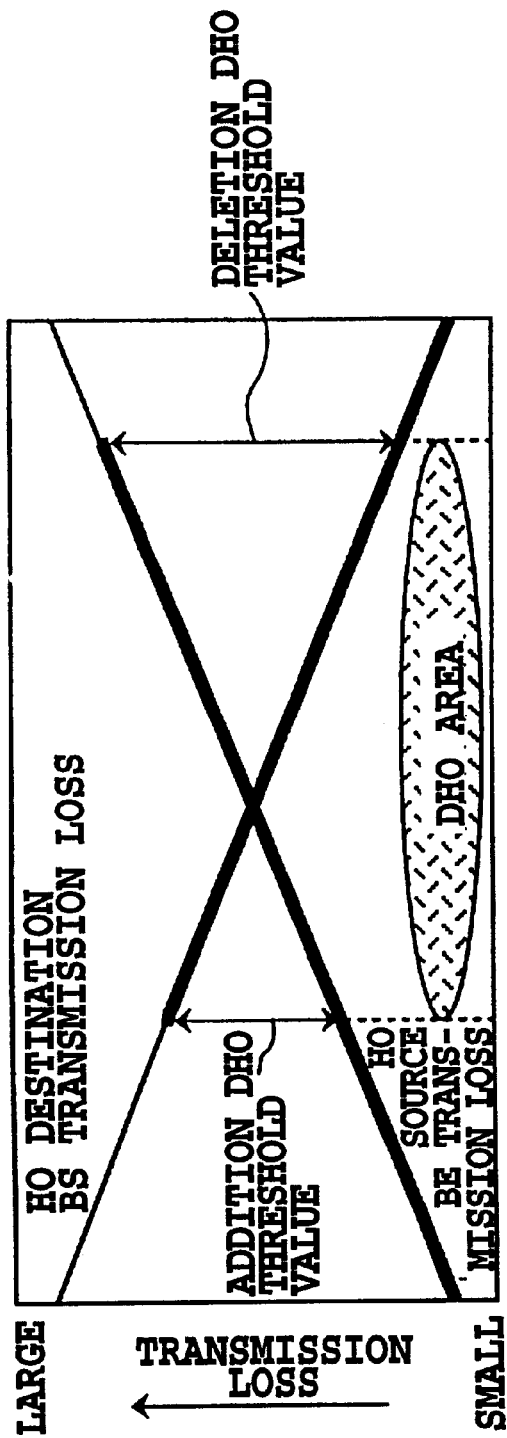
FIG. 3 is a diagram illustrating images of an addition DHO threshold value and a deletion DHO threshold value.

FIG. 3 shows an image of an addition DHO threshold value and a deletion DHO threshold value. In FIG. 3, the vertical axis indicates the transmission loss level, and the horizontal axis represents the distance the mobile station travels.

As shown in FIG. 3, when the mobile station moves from left to right on the horizontal axis and reaches the DHO area, it enters the diversity condition, and communicates through two branches at the same time. During this state, the handover (HO) is carried out. The mobile station is communicating through one branch on the left-hand side of the DHO area. Thus, one addition branch candidate takes place when the mobile station enters the DHO area during one branch communications, and one deletion branch candidate appears when it passes through the DHO area to the right-hand side during the two branch communications. The mobile station detects the addition and deletion branch candidates in accordance with the difference between the HO (handover) source BS transmission loss and the HO destination BS transmission loss (addition/deletion branch candidate decision conditions). If the difference becomes smaller than the addition DHO threshold value (meets the addition branch candidate decision condition), the mobile station detects the addition branch candidate, whereas if the difference becomes greater than the deletion DHO threshold value (meets the deletion branch candidate decision condition), it detects the deletion branch candidate. In both the DHO operations (the addition and deletion DHO operations), the least transmission loss among the branches is used as a reference HO source BS transmission loss during communications through a plurality of communication branches. The deletion DHO threshold value is made greater than the addition DHO threshold value, so that a difference (hysteresis) is provided to the two threshold values, thereby preventing the deletion DHO branch from being added soon again depending on changes in the radio conditions.

The mobile station notifies the network of both the addition branch candidates and communicating branches in such a manner that they are arranged in ascending order of the transmission loss, or in a given order with information indicative of the order of precedence, and are added to addition information parameters in a handover trigger signal. The deletion branch candidates, if there is any, are also notified in a similar manner in the form of deletion information parameters.

It is possible for the mobile services switching center to acquire information about the communicating branches, and this will make it unnecessary for the mobile station to transmit the information on the communicating branches to the mobile services switching center.

The information indicative of the order of precedence may be the foregoing arranged orders of the transmission losses of the addition branch candidates, or their absolute values or relative values. For example, values indicative of the lowness of the transmission losses can be transmitted in connection with the information about the branches independently of the arranged orders.

FIG. 4A illustrates an example of the format of the addition information parameters, and FIG. 4B illustrates an example of the format of the deletion information parameters.

In FIG. 4A, the communicating visitor location sector number indicates the number of sectors in DHO communications when the mobile station sends the handover trigger signal; the addition DHO candidate sector number indicates the number of sectors that can be added newly as the DHO candidates; a base station number indicates the number of a base station in DHO communications with the mobile station, or that of a base station of an addition branch candidate; a sector number indicates the number of a sector within the service area of the base station; a perch channel received SIR indicates the received SIR of a broadcasting control channel; and a perch channel transmission power level indicates the transmission power level of the broadcasting control channel. In the parameter list, sets of the base station number, sector number, perch channel received SIR and perch channel transmission power level are repeated by the number of times of the sum total of the communicating visitor location sector number and the addition DHO candidate sector number.

In FIG. 4B, the deletion DHO candidate sector number indicates the number of sectors of the DHO candidates that can be newly deleted, and sets of a base station number and a sector number are repeated by the number of times of the deletion DHO candidate sector number as in FIG. 4A.

Figure 5:
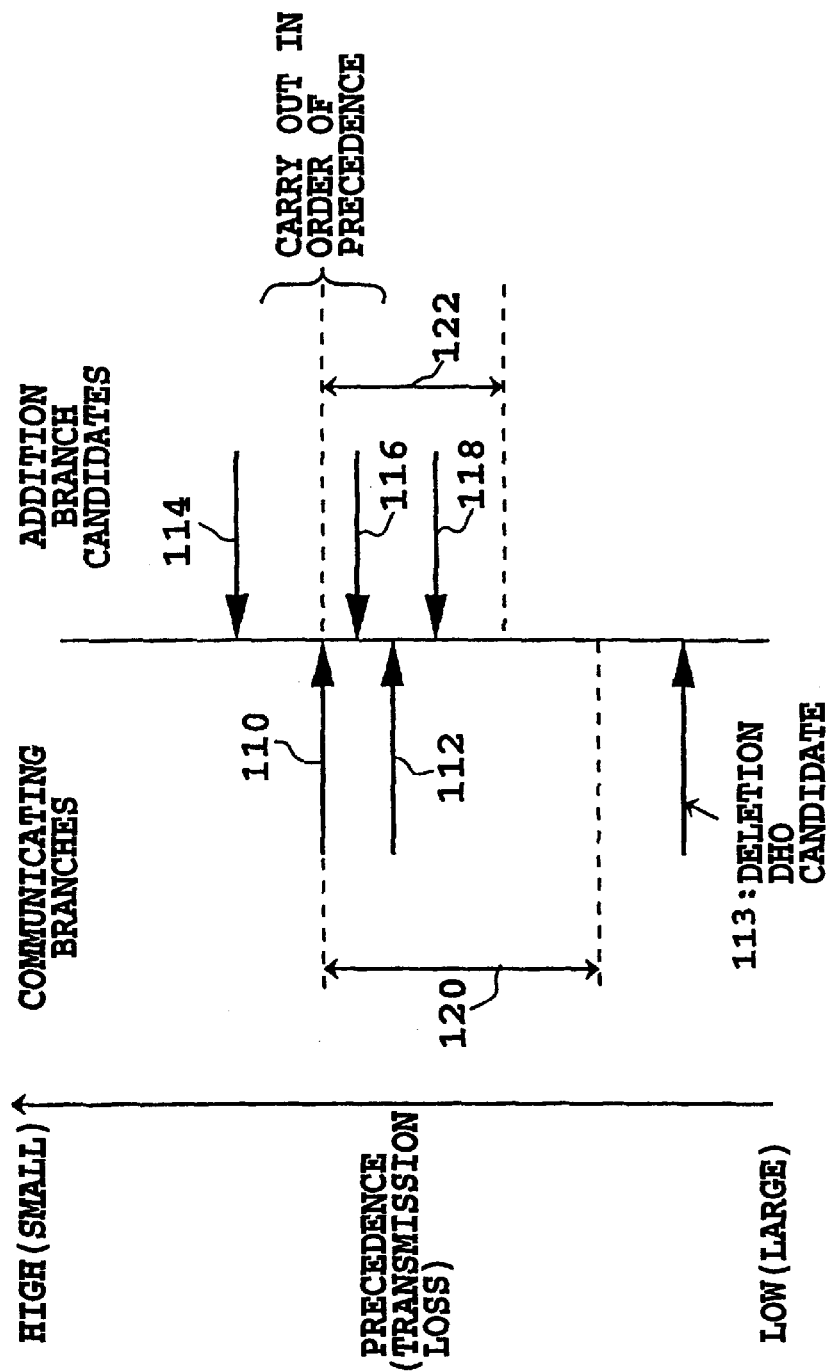
FIG. 5 is a diagram illustrating an image of the DHO performance in terms of a threshold value.

FIG. 5 illustrates a DHO performance image in terms of the threshold values.

In FIG. 5, the highest priority communicating branch is a branch 110, and the next highest one is a branch 112. Threshold values 120 and 122 are based on the highest priority branch 110 in the communicating branches. The threshold value 120 designates the deletion DHO threshold value, and the threshold value 122 designates the addition DHO threshold value. The network side extracts branches in order of the addition DHO precedence (in order of the branches 114, 116 and 118) by the number of branches the network side can handle, considering the number of branches in communications at present, and carries out the addition DHO. It is clear that since the addition DHO branch candidate 114 has a lower transmission loss than the communicating branch 110, it satisfies the addition branch decision conditions. Even the branch 116, which has a greater transmission loss than the branch 110 with a minimum transmission loss among the communicating branches, can be considered to have a higher precedence than the branch 118. In other words, the high priority means that the branch is given higher precedence in the addition processing.

The branch candidate selection by the mobile station in accordance with the present invention means that the mobile station carries out its control such that it does not notify the network side of the candidates that are unlikely to be subjected to the addition DHO among the addition branch candidates detected by the mobile station.

[Deletion DHO]

The radio branch connection and release image of the deletion DHO in FIG. 2 indicates that a radio branch 72 is deleted at a time 80 in the presence of a communicating branch 70. The cable branch connection and release image of the deletion DHO indicates that a cable branch 74 is deleted. In the branch control sequence in the deletion DHO, the deletion (radio) branch 72 is deleted first, and then the deletion (cable) branch 74 is deleted.

The mobile station monitors the radio conditions (for example, monitors the transmission losses on the perch) of the communicating sectors, and selects all the branches that meet the deletion branch candidate decision conditions as the deletion DHO candidates. In the deletion DHO, the DHO precedence is not considered. The deletion DHO candidates are deleted as soon as they are detected, because they do not contribute to the communications. The mobile station notifies the network side of the deletion DHO candidates by placing them into the deletion information parameters in the handover trigger signal. The deletion information parameters include the deletion DHO sector number, and the sets of the base station number and sector number which are repeated by the number of times of the deletion DHO sector number (see, the deletion information parameter format of FIG. 4B). As illustrated in FIG. 5, the network side carries out the deletion DHO, and deletes the deletion DHO candidates, the branch 113, for example. Alternatively, since the deletion DHO candidates are sure to be deleted when detected, the mobile station can autonomously delete them and notify the network side of that.

[Addition Deletion DHO]

The addition deletion DHO is one of the addition DHO operations based on the restrictions on the maximum radio branch number, and is activated when the sum total of the communicating branches and addition branches exceeds the maximum radio branch number. To achieve the addition deletion DHO effectively, the maximum cable branch number is set greater than the maximum radio branch number. Higher priority branches are added up to the maximum cable branch number in order of decreasing precedence in the addition deletion DHO.

Figure 6:
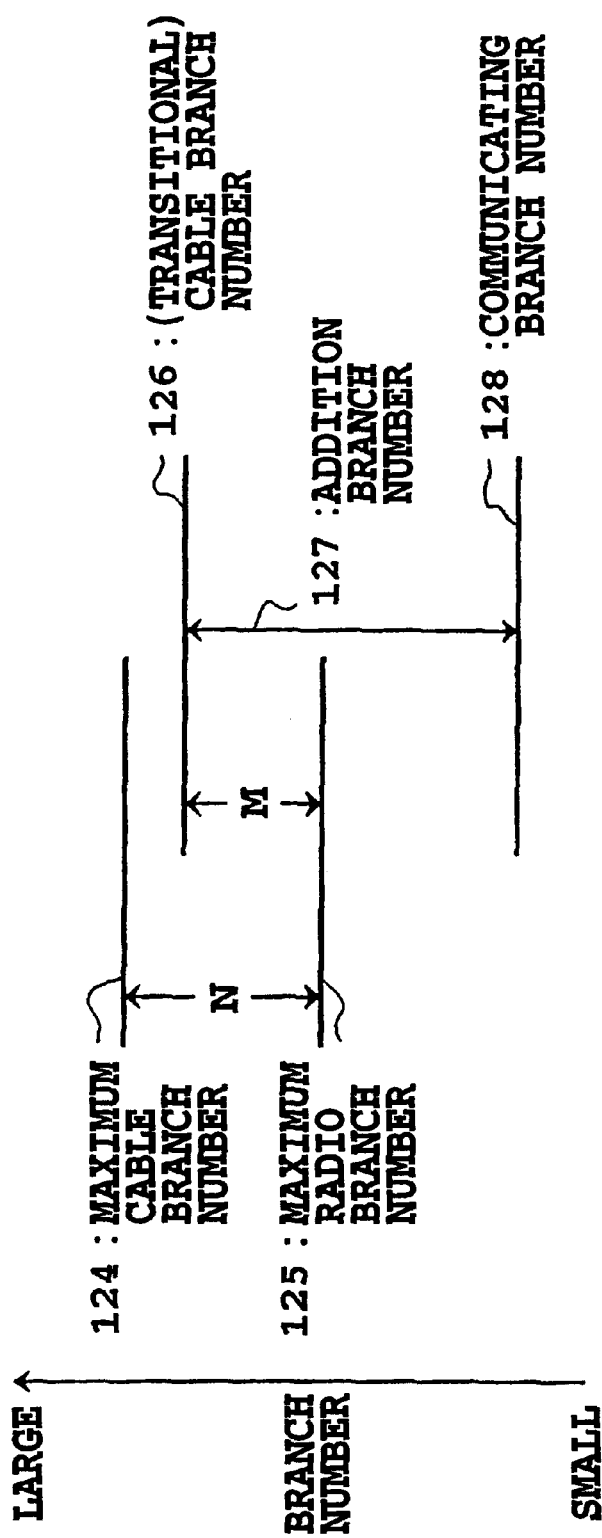
FIG. 6 is a diagram illustrating relationships between the branch numbers on a network side.

FIG. 6 illustrates relationships between these branch numbers seen from the network side.

As illustrated in FIG. 6, a (transitional) cable branch number 126, which is the sum total of the communicating branch number 128 and the addition branch number 127, exceeds the maximum radio branch number 125. The cable branches corresponding to the excess, that is, the (transitional) cable branch number 126-the maximum radio branch number 125=M cable branches, are provided transitionally for carrying out effective addition DHO. The network side eventually deletes M branches in order of increasing precedence (in order of decreasing transmission loss, for example) within the (transitional) cable branches, inclusive of communicating branches, where M is equal to or less than N, where N equals the maximum cable branch number 124-the maximum radio branch number 125. In the radio section, addition of the radio branches and switching of them are carried out in response to the finally selected cable branches. It is also possible to take such a control method that omits the addition of those candidates which are most likely to be deleted because of their lower precedence than the communicating branches even though they are added as the cable branches.

The radio branch connection and release image of the addition deletion DHO in FIG. 2 indicates that a new branch 92 is added in the presence of branches 90 and 91 at a time 100, the branch 91 is deleted by switching at a time 102, and then a branch 93 is added by switching after the time 102. The point of intersection of the time 102 and the branch 93 is represented by an open circle because the maximum radio branch number is set at three. On the other hand, the cable branch connection and release image indicates that cable branches 96 and 98 are added, and a cable branch 94 is deleted. The branch control sequence in the addition deletion DHO takes place in order of (1) the addition of the branches 96 and 98; (2) addition of the branch 92; (3) deletion of the branch 91 by switching; (4) addition of the branch 93 by switching; and (5) deletion of the branch 94.

Figure 7:
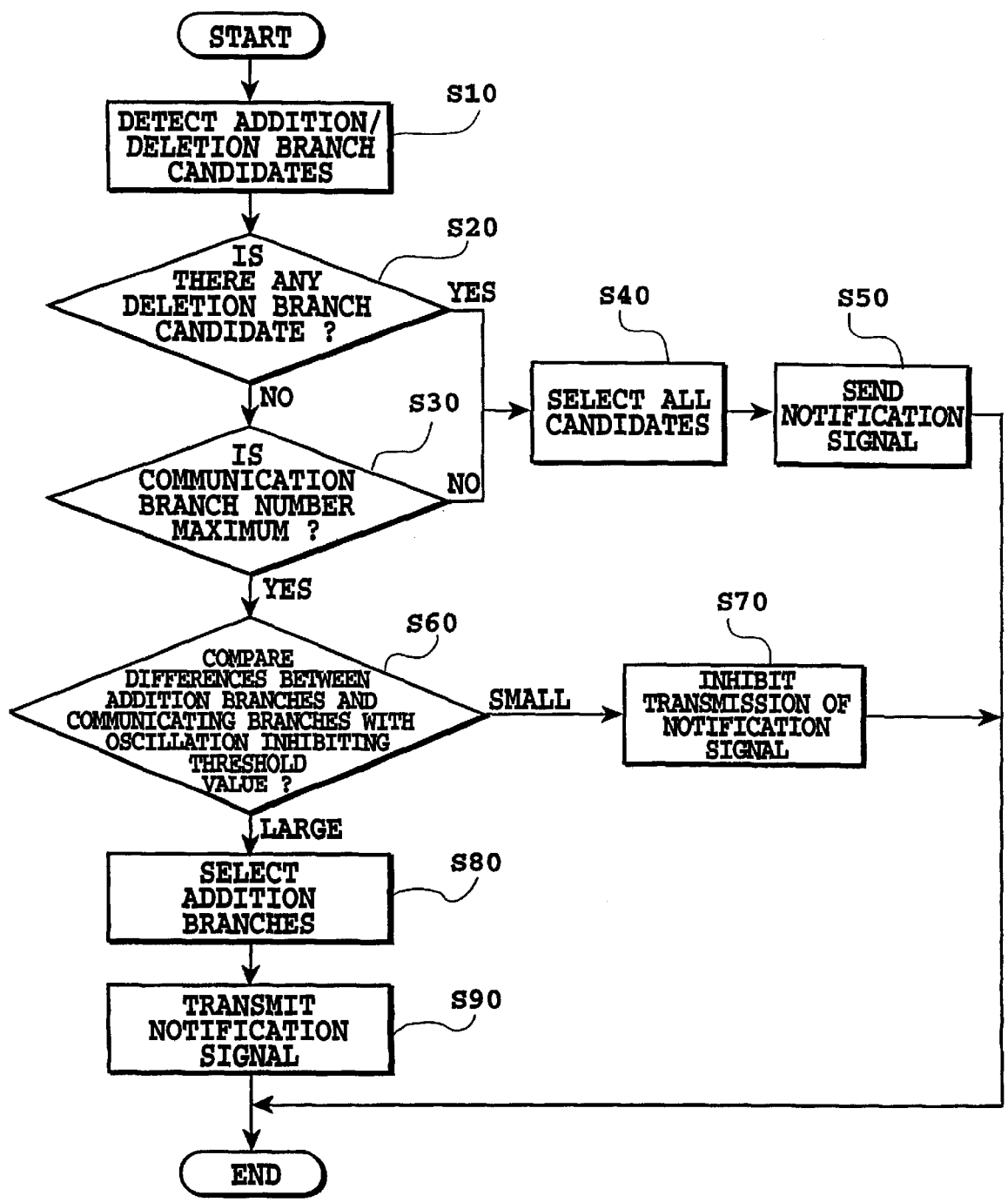
FIG. 7 is a flowchart illustrating the details of hand over trigger signal transmission algorithm in a mobile station.

FIG. 7 is a flowchart illustrating the details of handover trigger signal transmission algorithm in the mobile station.

In FIG. 7, the mobile station monitors the radio conditions of its current sector and peripheral sectors to detect addition branch candidates and deletion branch candidates at step S10. The mobile station places the communicating branches and addition branch candidates into the addition information parameters in the handover trigger signal, and the deletion branch candidates into the deletion information parameters in the same signal. The mobile station sets the addition information parameters in the following conditions, and sends them through steps S20–S90.

When one or more deletion branch candidates are present (step S20), the mobile station places all the communicating branches and addition branch candidates into the addition information parameters, and sends them through steps S40 and S50 (Condition 1).

When no deletion branch candidate is present and the number of the communicating radio branches is less than the maximum value (step S30), the mobile station places all the detected addition branch candidates and the communicating branches in the addition information parameters, and sends them through steps S40 and S50 (Condition 2).

If the number of the communicating radio branches equals the maximum value (step S30), the mobile station decides as to the communicating branches and the addition branch candidates whether their difference (in the transmission loss, for example) is greater than the oscillation inhibiting threshold value by comparing them at step S60, and sends only the addition branch candidates with a difference greater than the oscillation inhibiting threshold value by placing them into the handover trigger signal through steps S80 and S90 (Condition 3), without sending them otherwise (step S70).

A first reason for imposing a rigid condition such as the condition 3 on the candidate transmission when the number of communicating radio branches is maximum is that it is known beforehand that those addition branch candidates which meet the normal addition branch decision conditions but have lower precedence than any other communicating branches are not subjected the addition processing even though they are sent to the network side. Thus, notifying the network side of them as the addition branch candidates is avoided.

Figure 8:
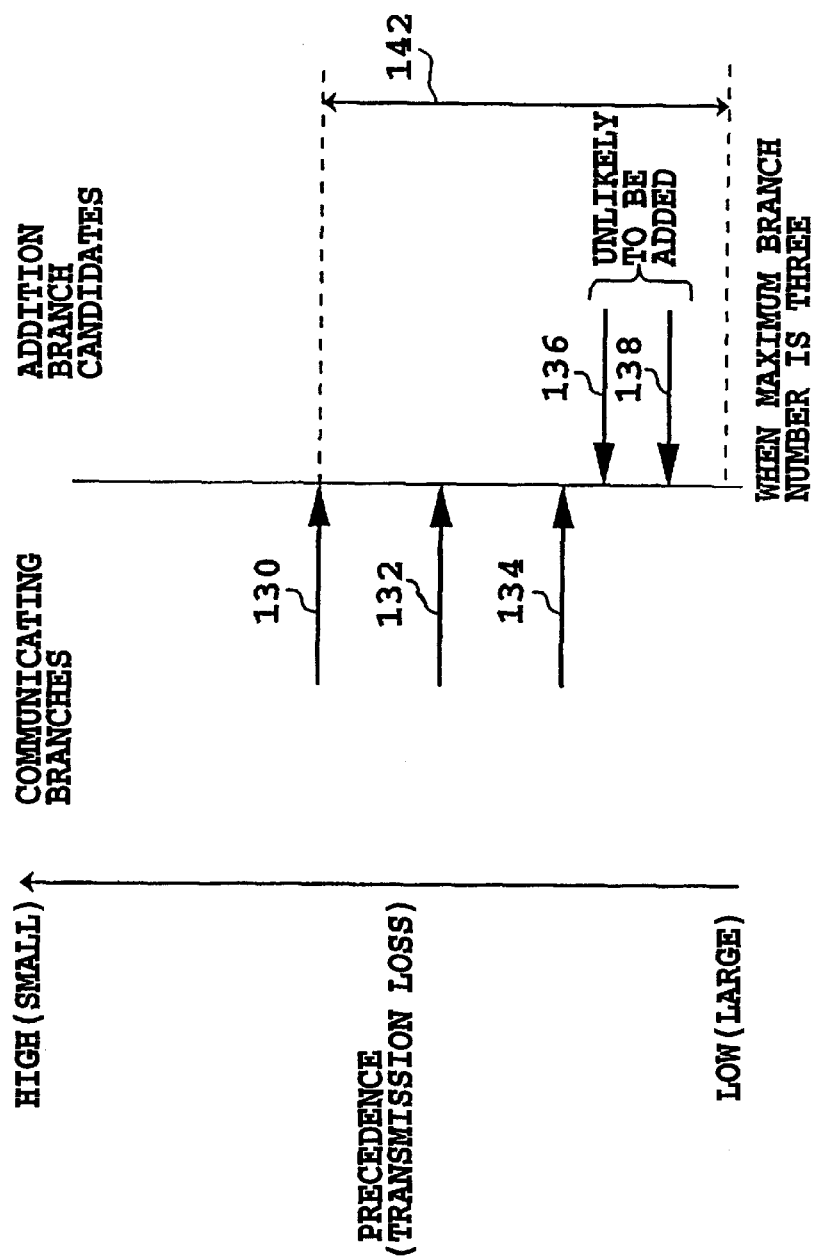
FIG. 8 is a diagram illustrating an example, in which no addition branch candidate is notified during maximum radio branch communications.

FIG. 8 illustrates an example that does not notify the network side of the addition branch candidates during communications using the maximum number of radio branches.

Figure 9A:
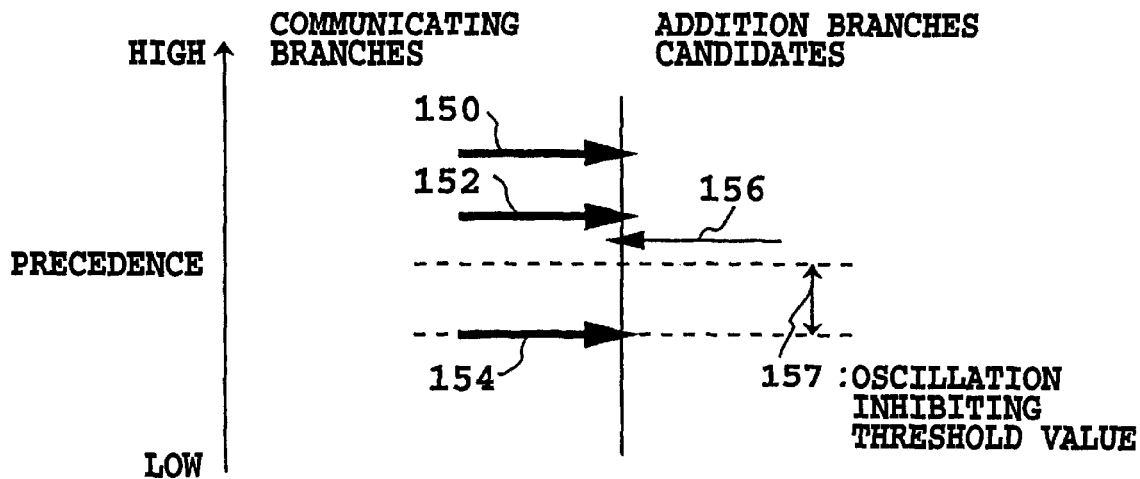
FIG. 9A is a diagram illustrating an oscillation inhibiting threshold value in the case where the addition branch candidate is added.
Figure 9B:
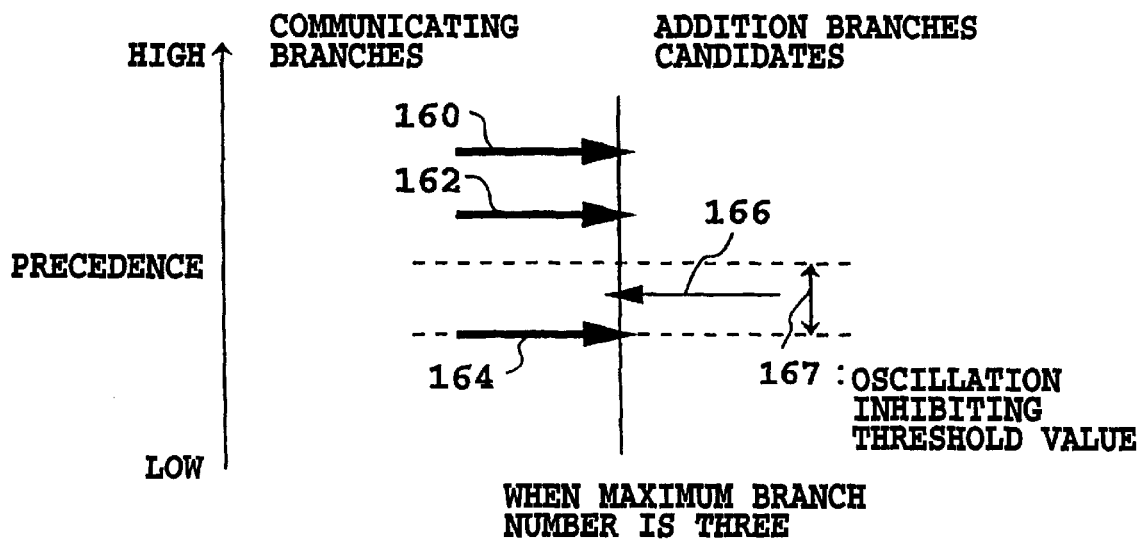
FIG. 9B is a diagram illustrating an oscillation inhibiting threshold value in the case where no addition branch candidate is added.

In FIG. 8, branches 130, 132 and 134 are communicating branches, and the threshold value 142 indicates an addition DHO threshold value. Although the branches 136 and 138 are addition branch candidates because they meet the addition branch candidate decision conditions (because the differences in the transmission losses between them and the branch 130 are less than the addition DHO threshold value 142), they are highly unlikely to be added because their precedence is lower than the lowest communicating branch 134. Furthermore, the oscillation inhibiting threshold value is set to prevent the repetition of the addition and deletion, that is, "oscillation", by imposing more strict condition (second reason). Those branches that are deleted at the start of the addition deletion DHO are deleted not because they meet the deletion branch candidate conditions, but because they become lower than other branches. If a branch that meets the requirements for a communication branch and contributes communications is replaced by an addition branch candidate with a slightly higher priority, it is very likely that the replaced branch is added again instead of the added addition branch candidate because of fluctuations in the radio section. Such an operation, if repeated, will increase the control load of the network side. To prevent such oscillation, the oscillation inhibiting threshold value is set. The oscillation inhibiting threshold value is set under the assumption that the differences are considered between the addition branch candidates and the communicating branch with the lowest priority (because of a large transmission loss, for example) during the communications using the maximum number of radio branches, and the decision is made by comparing the differences with the threshold value so that the addition is made if the differences are greater than the oscillation inhibiting threshold value. FIGS. 9A and 9B are diagrams illustrating the oscillation inhibiting threshold value. FIG. 9A illustrates a case when an addition branch candidate is added, whereas FIG. 9B illustrates a case when it is not added. An addition branch candidate lower in precedence than the communicating branches, that is, lower than the lowest priority communicating branch among them is not added because it is unlikely to be added. If it has a slightly higher priority, it is not added because it will cause the oscillation.

In FIG. 9A, branches 150, 152 and 154 are communicating branches and a branch 156 is an addition branch candidate with precedence above the oscillation inhibiting threshold value 157.

In FIG. 9B, branches 160, 162 and 164 are communicating branches and a branch 166 is an addition branch candidate with precedence below the oscillation inhibiting threshold value 167.

When one or more deletion branch candidates are present, or when the number of the communicating branches is less than maximum, the mobile station notifies the network side of all the candidates. In this way, the network side can obtain alternative addition branch candidate, even if it rejects a particular addition branch candidate owing to some reason.

It will be obvious for those skilled in the art that such control can be implemented without any inconvenience that adds only addition branch candidates which are very likely to be added. This is analogous to the foregoing case in which it is possible to circumvent any cable branch addition processing of the candidates which are very likely to be deleted because of their lower precedence than the communicating branches even though they are added as the cable branch candidates.

Figure 10:
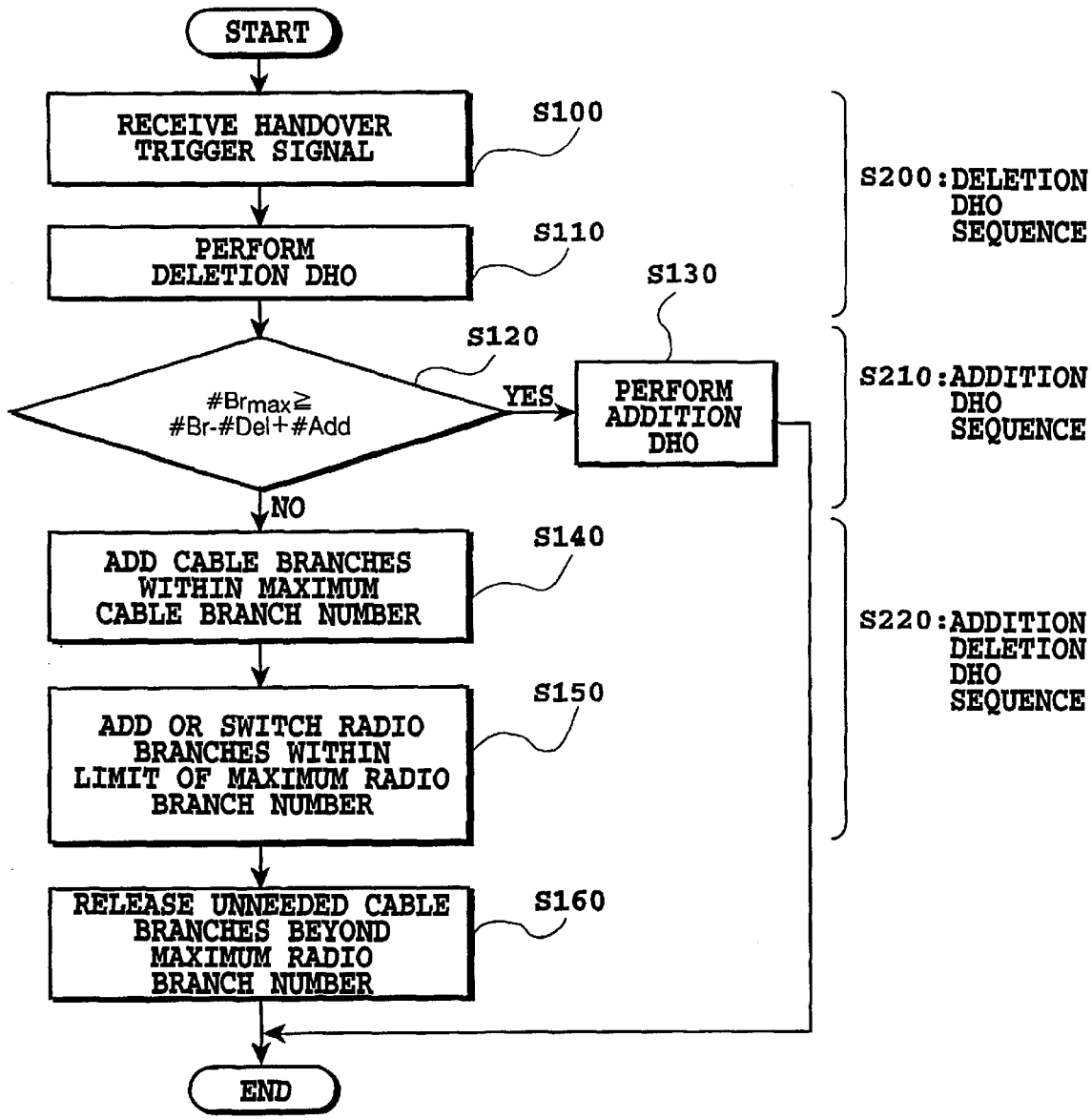
FIG. 10 is a flowchart illustrating the details of DHO performance algorithm in a network.

FIG. 10 is a flowchart illustrating the details of the DHO performance algorithm in the network.

In FIG. 10, receiving the handover trigger signal at step S100, the network side carries out the deletion DHO first at step S110, and then the addition DHO at step S130 after completing the deletion DHO. The deletion DHO sequence (step S200) is for increasing the number of branches that are available simultaneously in the addition DHO by releasing beforehand those branches not contributing to the communications by performing the deletion DHO prior to the addition DHO. When the mobile station carries out the deletion DHO autonomously, it can perform the deletion DHO independently of the addition DHO which is carried out after receiving the handover trigger. It is preferable, however, to carry out the deletion DHO before triggering the addition DHO. The procedure of the addition DHO is divided depending on whether the sum total of the communicating branch number (#Br)–the deletion DHO branch number (#Del) (that is, the communicating branch number after completing the deletion DHO) and the addition DHO branch number (#Add) exceeds the maximum radio branch number (#Brmax) or not.

First, when the sum total (#Br–#Del+#Add) of the communicating branch number and the addition branch candidate number does not exceed the maximum radio branch number (#Brmax), the network side carried out the addition DHO in a normal procedure (steps S120 and S130 of the addition DHO sequence S210).

In contrast, when the sum total (#Br–#Del+#Add) of the communicating branch number and the addition branch candidate number exceeds the maximum radio branch number (#Brmax), the network side carried out the addition deletion DHO (the addition deletion DHO sequence S220). The cable branches are added up to the maximum cable branch number (step S140). Subsequently, the addition and switching of the radio branches are carried out up to the maximum radio branch number (#Brmax) (step S150). Finally, unneeded cable branches exceeding the maximum radio branch number (#Brmax) is released (step S160).

Figure 11:
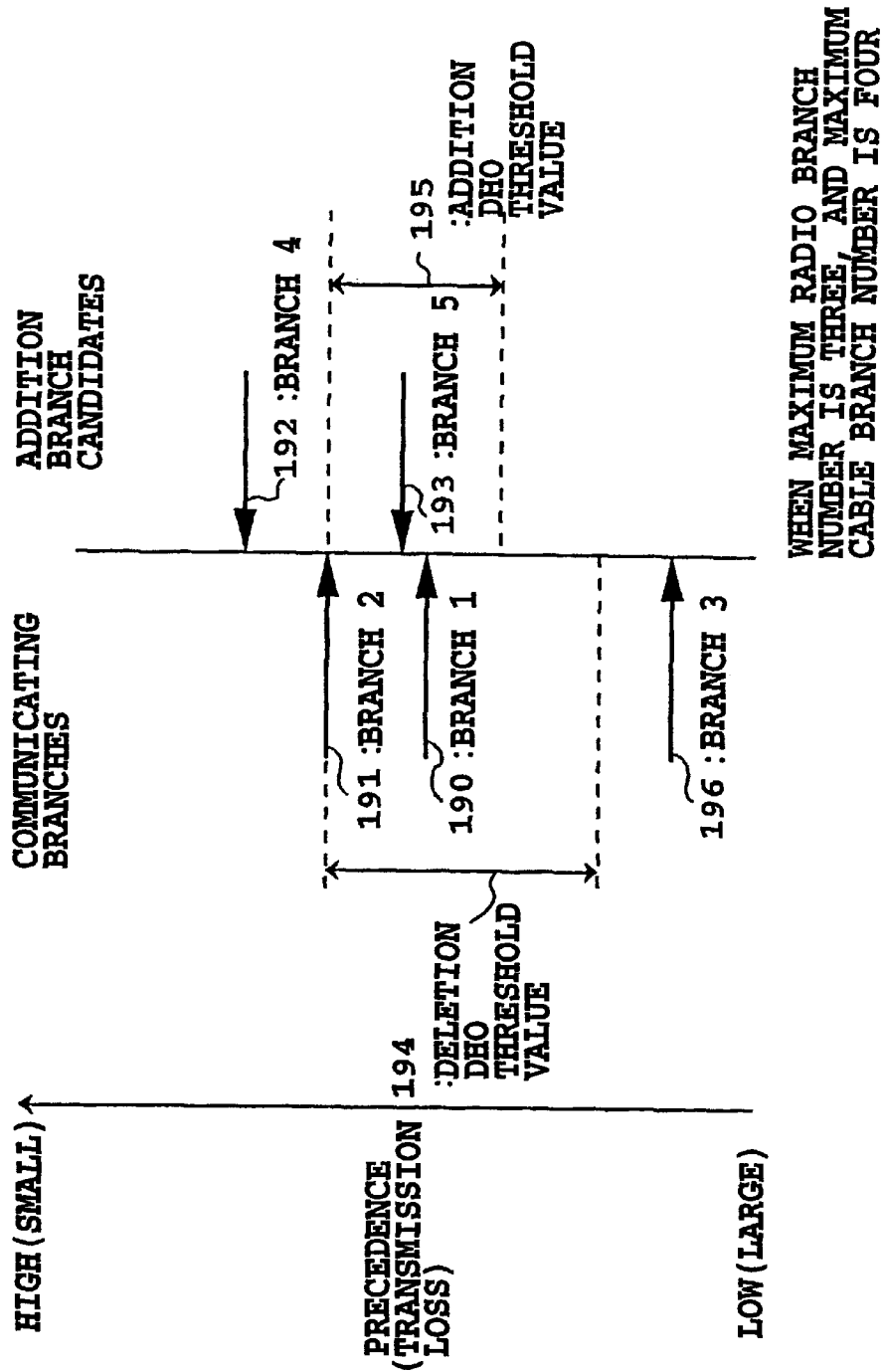
FIG. 11 is a diagram illustrating branches for activating a DHO sequence.

FIG. 11 is a branch diagram for activating the DHO sequence.

In FIG. 11, a branch 1 (190), branch 2 (191) and branch 3 (196) are communicating branches, in which the branch 3 (196) is below a deletion DHO threshold value 194. A branch 4 (192) and branch 5 (193) are addition branch candidates, in which the branch 5 (193) is within an addition DHO threshold value 195, and the branch 4 (192) has higher precedence than the branch 2 (191).

Figure 12C:
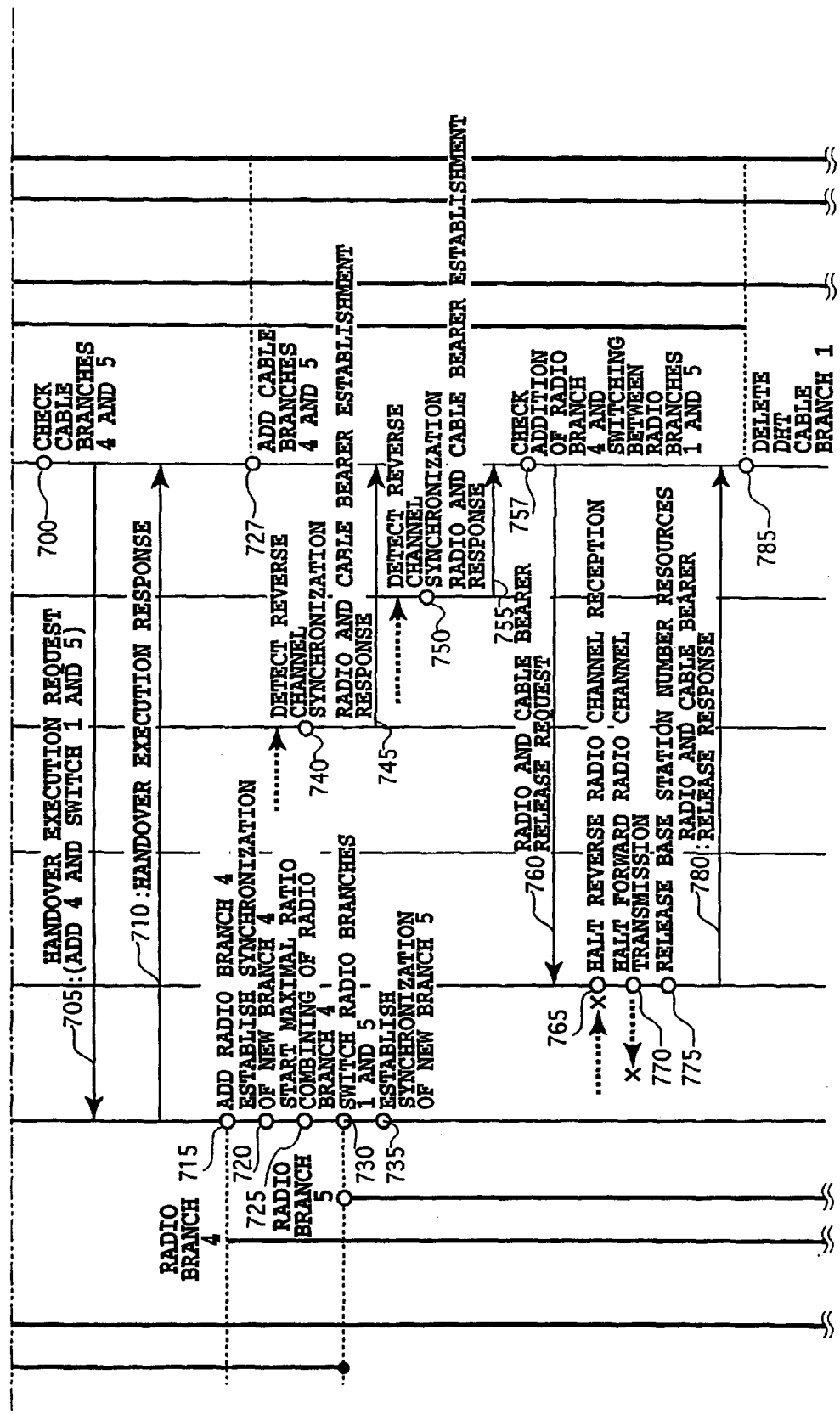
FIG. 12C is a diagram illustrating the DHO processing sequence when the radio condition as illustrated in FIG. 11 takes place in the mobile station.

FIGS. 12A, 12B and 12C are linked in this order, and illustrate the DHO processing sequence of performing under the control of the network the addition deletion DHO after the deletion DHO in the case where the precedence of the branches is as shown in FIG. 11, where it is assumed that the maximum radio branch number is three and the maximum cable branch number is four.

FIG. 12A shows the deletion DHO sequence, in which an unneeded radio branch is deleted.

FIG. 12A shows three radio branches 1–3, three cable branches 1–3, and five base stations with base station numbers 1–5. A mobile station 500 detects addition DHO candidates and deletion DHO candidates (501), and decides addition DHO candidates and deletion DHO candidates (505). The mobile station 500 sends to a network 503 a handover trigger request (branch deletion or branch addition) (510). The network 503 extracts the deletion DHO candidates (517), and sends to the mobile station 500 a handover execution request (deletion of the branch 3) (515). The mobile station 500 sends back to the network 503 a handover execution response (520). Then, the mobile station 500 deletes the radio branch 3 (525), and suspends the maximal ratio combining of the radio branch 3 (530), as represented by the deletion of the line of the radio branch 3 at 530 as indicated by a broken line.

The network 503 sends to the base station with the base station number 3 a radio and cable bearer release request (535). The base station with the base station number 3 halts the reception of the reverse radio channel (540), halts the transmission of the forward radio channel (545), releases base station number resources (550), and sends back to the network 503 a radio and cable bearer release response (560). The network 503 deletes the DHT cable branch 3 (565).

FIGS. 12B and 12C illustrate an addition deletion DHO sequence which adds cable branches 4 and 5 in advance, adds a radio branch 4 corresponding to the added cable branches, carries out switching between the radio branches 1 and 5, and finally deletes the cable branch 1 that becomes unnecessary.

In FIG. 12B, the network 503 detects addition DHO candidates (600), decides an addition DHO destination (605), and adds the cable branches 4 and 5 (610). The addition of the cable branches 4 and 5 is represented in FIG. 12B by lines of the cable branches 4 and 5 appearing from the position indicated by a broken line. The network 503 sends to the base stations with the base station numbers 4 and 5 a radio and cable bearer establishing request (615 and 620). The base stations with the base station numbers 4 and 5 each send to the mobile station 500 a forward radio channel transmission start (625 and 630), receive a reverse radio channel reception start (635 and 640), and sends to the network 503 a radio and cable bearer establishment response (645 and 650).

In FIG. 12C, the network 503 checks the cable branches 4 and 5 (700). The network 503 sends to the mobile station 500 a handover execution request (for adding the branch 4 and switching between the branches 1 and 5) (705), and the mobile station 500 sends back to the network 503 a handover execution response (710). The mobile station 500 adds the radio branch 4 (715), establishes synchronization of the new branch 4 (720), starts the maximal ratio combining of the radio branch 4 (725), switches the radio branches 1 and 5 (730), and establishes the synchronization of the new branch 5 (735). On the other hand, the network 503 adds the cable branches 4 and 5 (727). The base station with the base station number 4 detects the reverse radio channel synchronization (740), and sends back to the network 503 a radio and cable bearer establishment response (745). The base station with the base station number 5 detects the reverse radio channel synchronization (750), and sends back to the network 503 a radio and cable bearer establishment response (755). The network 503 adds the radio branch 4 and checks the switching between the radio branches 1 and 5 (757), and sends to the base station with the base station number 1 a radio and cable bearer release request (760). The base station with the base station number 1 halts the reception of the reverse radio channel (765), halts the transmission of the forward radio channel (770), releases the base station number resources (775), and sends back to the network 503 a radio and cable bearer release response (780). The network 503 deletes the DHT cable branch 1 (785).

Next, control will be described of a candidate which is not added because of the restrictions on the cable branch number (maximum cable branch number), though the mobile station notifies the network side of the candidate. The maximum number of branches that can be handled in single network control is limited to the maximum cable branch number. Thus, when the sum total of the communicating branches and the addition branch candidates exceeds the maximum cable branches, it is probable that the single control cannot add some addition branch candidates although they have higher precedence than the communicating branches.

Figure 13:
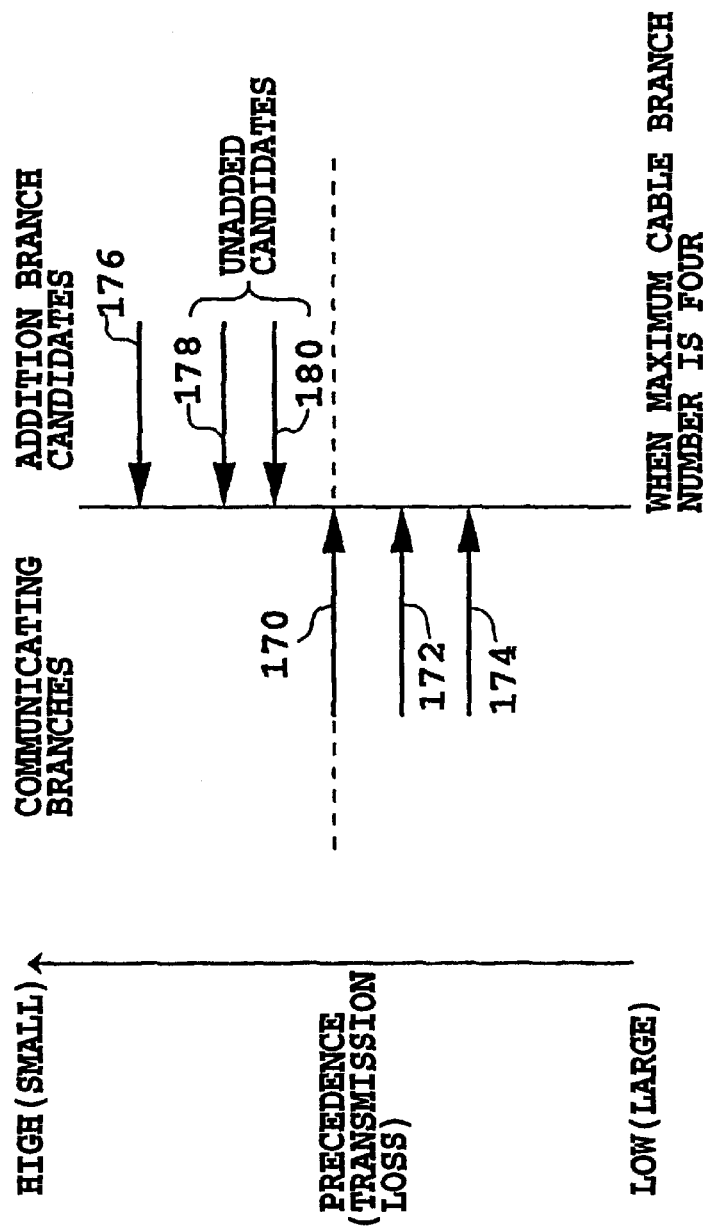
FIG. 13 is a diagram illustrating an example of candidates that cannot be added because of restrictions on a maximum cable branch number.

FIG. 13 illustrates such addition candidates which cannot be added because of the maximum cable branch number.

In FIG. 13, branches 170, 172 and 174 are communicating branches, and branches 176, 178 and 180 are addition branch candidates. Although the branches 178 and 180 have higher precedence than the communicating branch 170, they are not added because of the maximum cable branch number of four. Only the addition candidate branch 176 with the highest precedence is added by the single control.

In such a case, a control method can be introduced that notifies the network again of the unadded addition branch candidates 178 and 180 by putting them into the handover trigger signal in response to the measurement on the mobile station side. The network side can perform the addition DHO of the addition branch candidates 178 and 180 that are not added in the first control, at the point of time it receives the handover trigger signal including them. Alternatively, the network side can choose a method that stores the addition branch candidates 178 and 180, and successively carries out the addition DHO for those candidates that are omitted in the first control after completing the series of the operations as shown in FIG. 10.

In the present invention, selecting the branch candidates considering the maximum cable branch number and the maximum radio branch number, the mobile station notifies the network side of only the candidates that are most likely to undergo the DHO processing by excluding in advance the branch candidates that are unlikely to be handled in the DHO processing even though the mobile station notifies the network side of them. In this case, the following two methods can be employed.

First, considering the case where the network side cannot add an addition branch candidate of a higher precedence because of some reason, the mobile station notifies the network side of alternative addition branch candidates that are unlikely to be added if the branch candidate of a higher precedence is added. Thus, all the addition branch candidates are notified of. Nevertheless, the mobile station keeps performing the control that does not notify the network side of the addition branch candidates with lower precedence than the communicating branches during communications using the maximum number of the communicating branches. This is because it cannot be expected that these branches with the lower precedence than the communicating branches are added because the maximum number of communicating branches are already used.

Second, the mobile station notifies the network side of only the addition branch candidates that are likely to be added in the normal DHO processing without notifying of the alternative addition branch candidates. Although this method has an advantage over the first method of being able to reduce an amount of signals, the mobile station must consider the relationships between the number of the communicating branches and the number of the deletion branch candidates. That is, since the deletion DHO is carried out previously, such control is required that selects only addition branch candidates that are most likely to be added after the deletion DHO which is executed beforehand.

In the present invention, the mobile station notifies the network side not only of the addition branch candidates by putting them into the notification signal (handover trigger signal), but also of the communicating branches in combination with the information about the precedence by putting them into the handover trigger signal. For example, magnitudes of the transmission loss are retained in the notification signal in order of precedence as an indicator of the precedence. It is not necessary to notify the network side of the deletion branch candidates because they do not contribute to the communications. Thus, they are detected and deleted without being sent to the network side with the communicating branches that are transmitted in combination with the information about their precedence. Since the network side can compare the precedence between the communicating branches and the addition branch candidates, it can decide the addition branch candidates to be added, and the communicating branches to be retained or deleted as needed.

The mobile station places into one handover trigger signal all the DHO candidates, that is, a plurality of addition branch candidates and deletion branch candidates, and notifies the network side of them. More specifically, the addition branch candidates are put into the addition information parameters in the handover trigger signal, and the deletion branch candidates are inserted into the deletion information parameters. It is needless to say that the communicating branches are put into the addition information parameters together with the addition branch candidates. This will make it possible to reduce the number of transmission of the handover trigger signal, enabling effective use of the radio resources. To simplify the processing, the network side separates the addition branch candidates from the deletion branch candidates, and sequentially carries out their DHO independently. Carrying out the deletion DHO in advance to delete unneeded branches makes it possible to add more addition branch candidates through a single transmission operation of the handover trigger signal, enabling more effective use of the radio and cable resources.

To achieve the deletion DHO under the control of the mobile station, the mobile station puts the deletion branch candidates into the handover trigger signal, notifies the network side of them, and releases the radio branches. Detecting the break of the radio channels associated with the deletion branch candidates notified, the network side releases the cable branches corresponding thereto.

Figure 14:
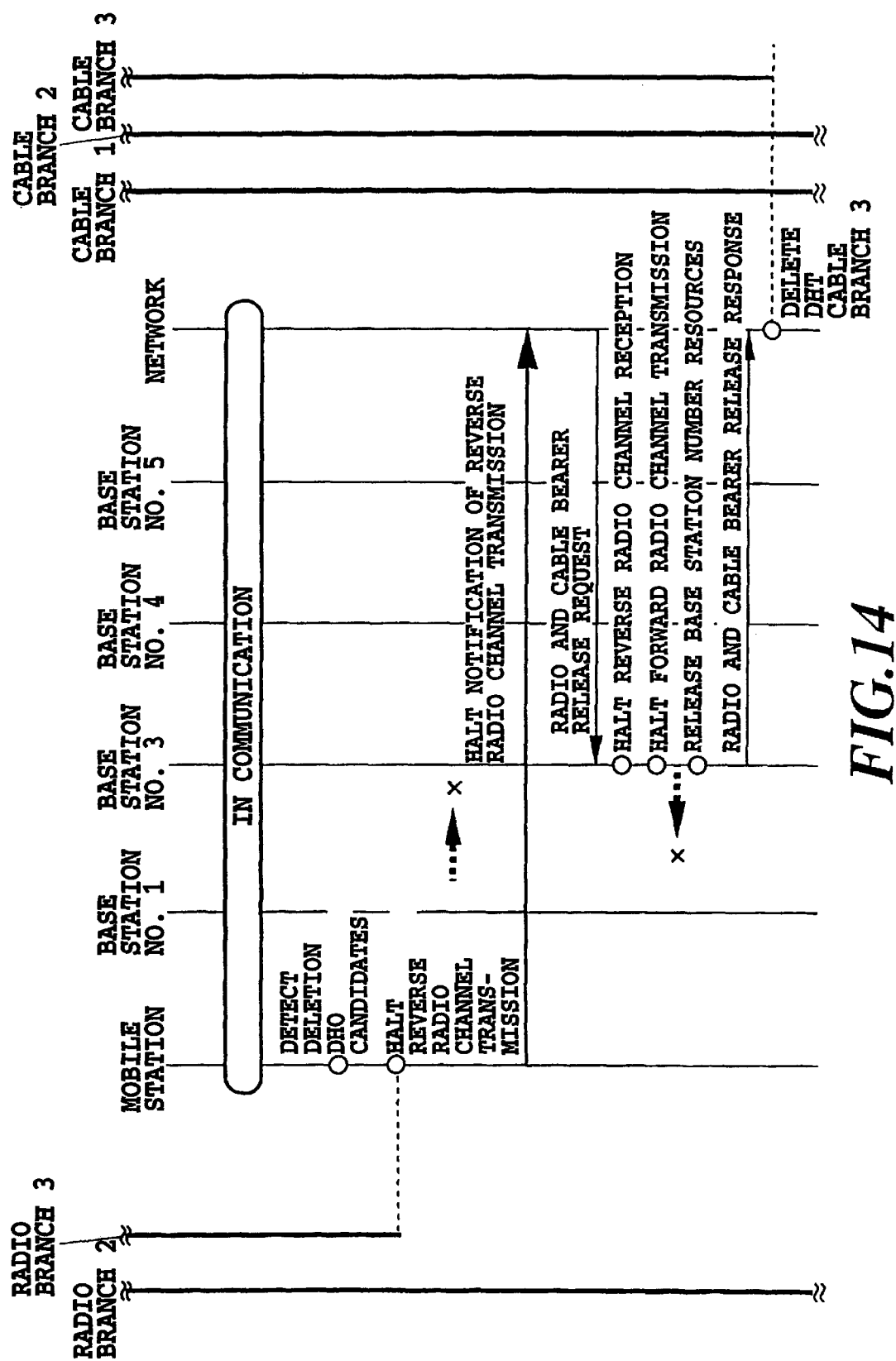
FIG. 14 is a diagram illustrating a deletion sequence.

FIG. 14 illustrates the deletion DHO sequence under the control of the mobile station. The addition DHO is carried out independently of this sequence.

By setting the maximum cable branch number at the maximum radio branch number plus N ($N \geq 1$), it becomes possible to add a greater number of cable branches in advance than when the maximum cable branch number is set at the maximum radio branch number plus one. This makes it possible to achieve more efficient control of the addition operation of a plurality of multiple addition branch candidates.

In the foregoing control, it is likely that the restrictions on the maximum cable branch number may result in an addition branch candidate to which no cable branch is added. In this case, the present invention can propose the following two methods.

1. The network side does not carry out any special control. The mobile station decides the addition branch candidates again in the condition of using new communication branches, notifies the network of the handover signal again so that the addition DHO of the unexecuted candidates is carried out.

2. The network side stores the addition branch candidates that are not handled by the first control, and autonomously carries out the second control.

Figure 15:
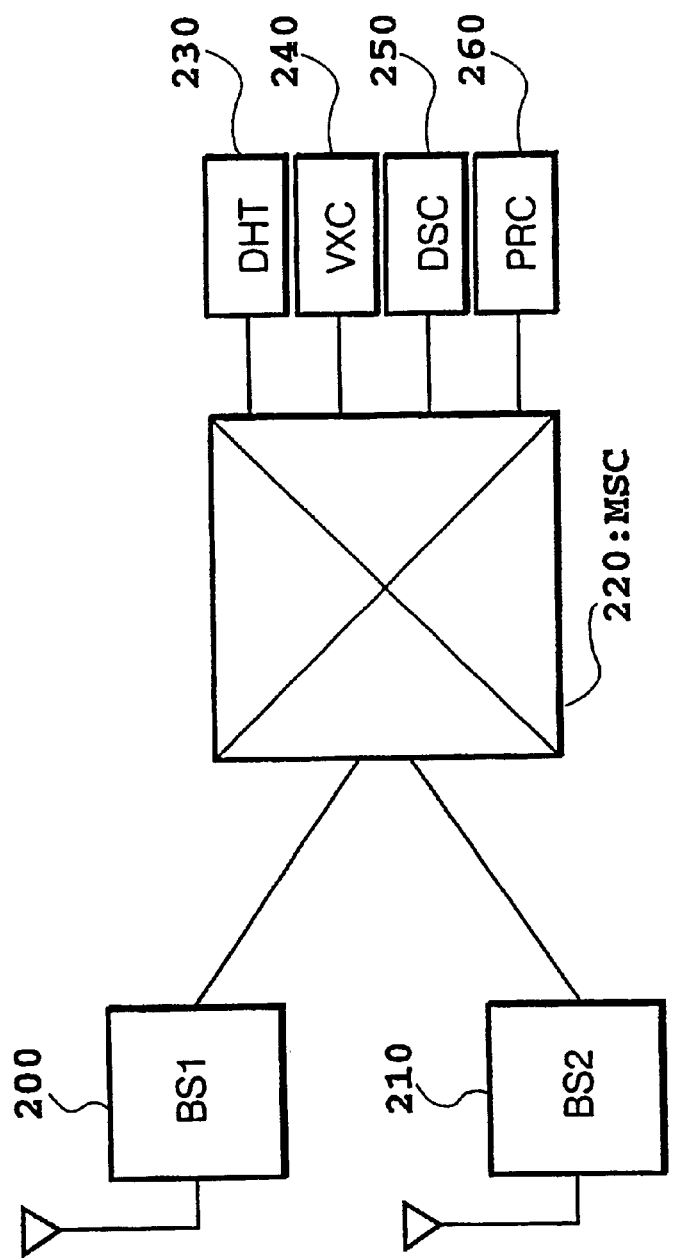
FIG. 15 is a diagram illustrating a deletion sequence.

FIG. 15 shows an embodiment of a configuration of base stations, a switching center and so on in accordance with the present invention.

In FIG. 15, a base station (BS1) 200 and a base station (BS2) 210 are connected to a MSC (Mobile services switching center) 220, to which a diversity handover trunk (DHT) 230, a voice encoder (VXC) 240, data service controller (DSC) 250 and processor (PRC) 260 are connected.

Figure 16:
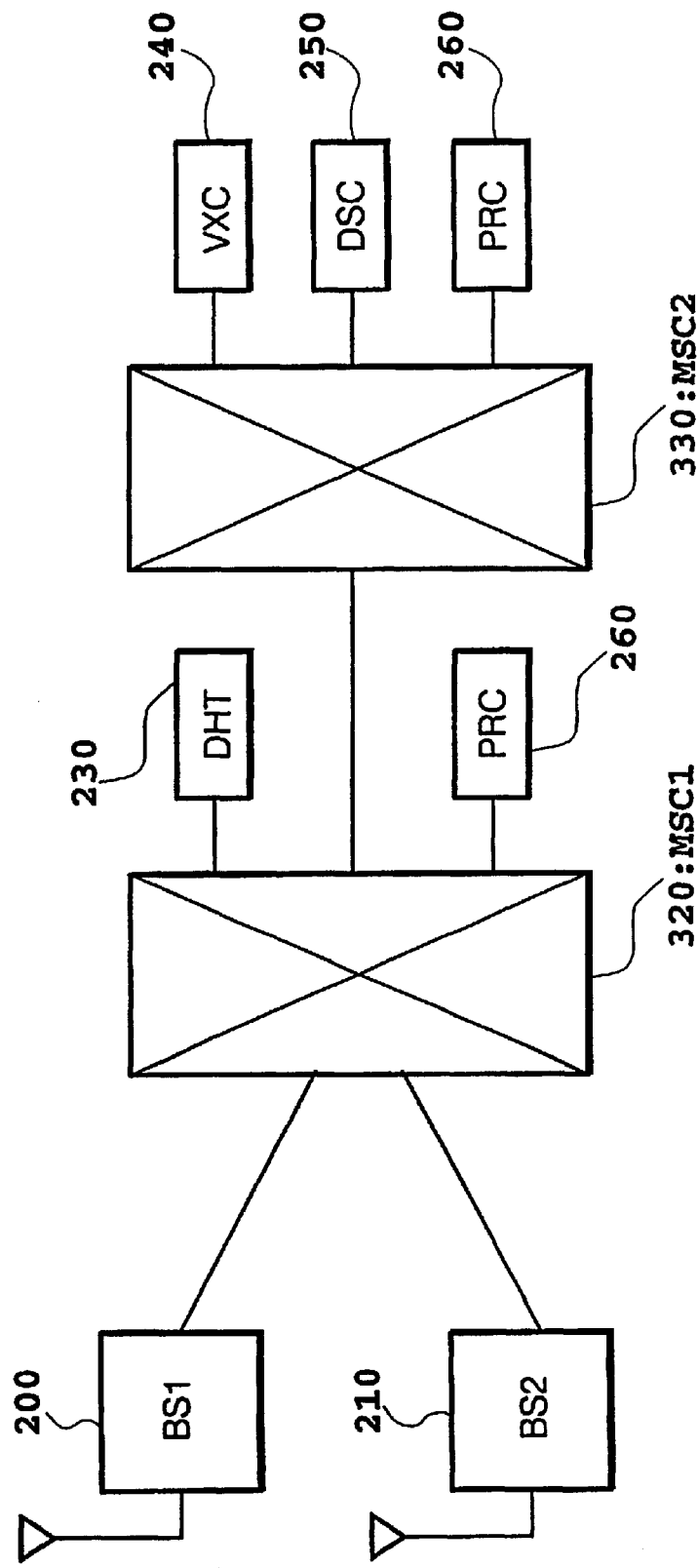
FIG. 16 is a diagram illustrating a deletion sequence.

FIG. 16 shows another embodiment of a configuration of the base stations, switching centers and so on in accordance with the present invention.

In FIG. 16, blocks having the same functions as those of FIG. 15 are designated by the same reference numerals, and the description thereof is omitted here. The configuration of FIG. 16 differs from that of FIG. 15 in that it comprises a new additional base station control office (MSC1) 320 with a function of controlling the base stations, which is connected to a mobile services switching center (MSC2) 330 with a normal switching function. The base station control office (MSC1) 320 can be installed near the base station BS1 or BS2. It is also possible to utilize a switching center of a fixed network as the switching center (MSC2) 330 without any change. The DHT 230 and PRC 260 are connected to the base station control office (MSC1) 320, and the VXC 240, DSC 250 and PRC 260 are connected to the switching center (MSC2).

As described above, the present invention provides a diversity handover branch control method in the DHO performance, in which a mobile station selects, when it detects a plurality of addition branch candidates and deletion branch candidates, branch candidates considering the maximum cable branch number and maximum radio branch number.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A diversity handover branch control method, in which a mobile station detects one or more addition branch candidates constituting handover candidates in communications between said mobile station and a base station connected to the mobile station, and notifies a switching center connected to the base station of the addition branch candidates, wherein said mobile station notifies, when a sum total of a communicating branch number and an addition branch candidate number is equal to or less than a simultaneously establishable maximum radio branch number between said mobile station and said base station, said switching center of said addition branch candidates.

* * * * *

UNITED STATES PATENT AND TRADEMARK OFFICE
CERTIFICATE OF CORRECTION

PATENT NO.   : 6,807,420 B2
DATED        : October 19, 2004
INVENTOR(S)  : Tomoyuki Ohtani et al.

It is certified that error appears in the above-identified patent and that said Letters Patent is hereby corrected as shown below:

Title page,
Item [56], References Cited, U.S. PATENT DOCUMENTS, insert
-- 5,267,261     11/1993            Blakeney, II et al. --
Item [62], Related U.S. Application Data, change "6,728,277" to -- 6,728,277 --
Item [60], Related U.S. Application Data, change "Provisional" to -- International --

Column 2,
Line 2, after "combining" remove "of"
Line 36, after "carried out on" insert -- a --
Line 45, before "extra time" remove "an"

Column 7,
Line 60, before "not contribute" change "does" to -- do --

Column 8,
Line 56, after "if there" change "is" to -- are --

Column 11,
Line 8, before "handover" insert -- a --
Line 50, after "candidates" change "is" to -- are --
Line 66, after "imposing" insert -- a --

Column 12,
Line 43, before "alternative" insert -- an --

Column 15,
Line 32, after "notified" remove "of"
Line 43, after "notifying" change "of" to -- about --

UNITED STATES PATENT AND TRADEMARK OFFICE
CERTIFICATE OF CORRECTION

PATENT NO.     : 6,807,420 B2
DATED          : October 19, 2004
INVENTOR(S)    : Tomoyuki Ohtani et al.

It is certified that error appears in the above-identified patent and that said Letters Patent is hereby corrected as shown below:

Column 16,
Line 14, change "transmission" to -- transmissions --

Signed and Sealed this

Third Day of May, 2005

JON W. DUDAS
*Director of the United States Patent and Trademark Office*